March 25, 1924.
O. W. HARMS
ART OF PACKING AND VENDING CIGARS
1,488,044
Filed Feb. 5, 1924    4 Sheets-Sheet 1
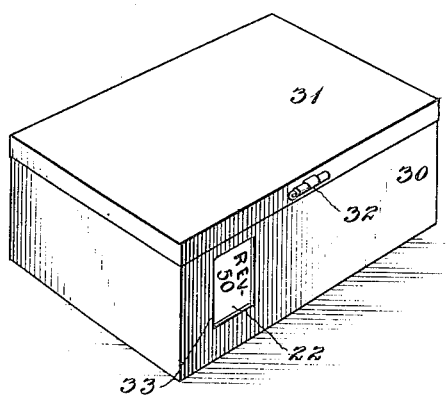
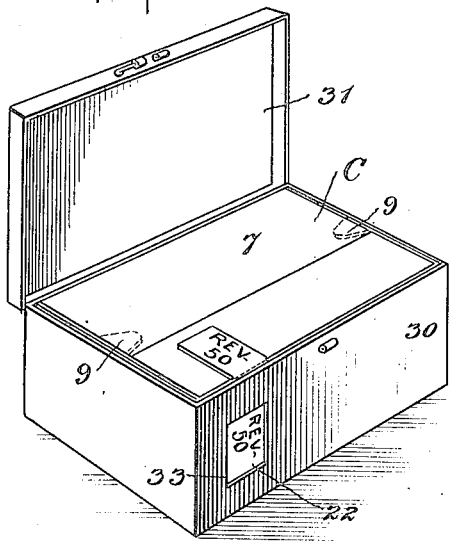
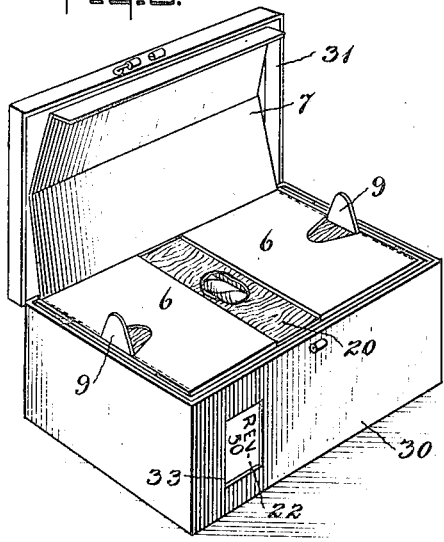
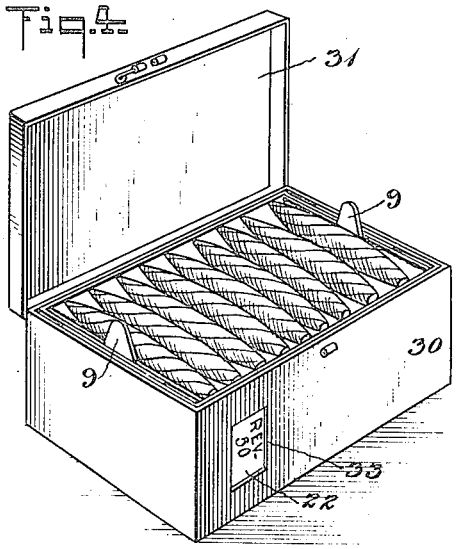
INVENTOR
Otto W. Harms.
BY
Meyers & Cavanagh
ATTORNEYS March 25, 1924.

O. W. HARMS

ART OF PACKING AND VENDING CIGARS

Filed Feb. 5, 1924     4 Sheets-Sheet 2

1,488,044

INVENTOR
Otto W. Harms.
BY
ATTORNEYS

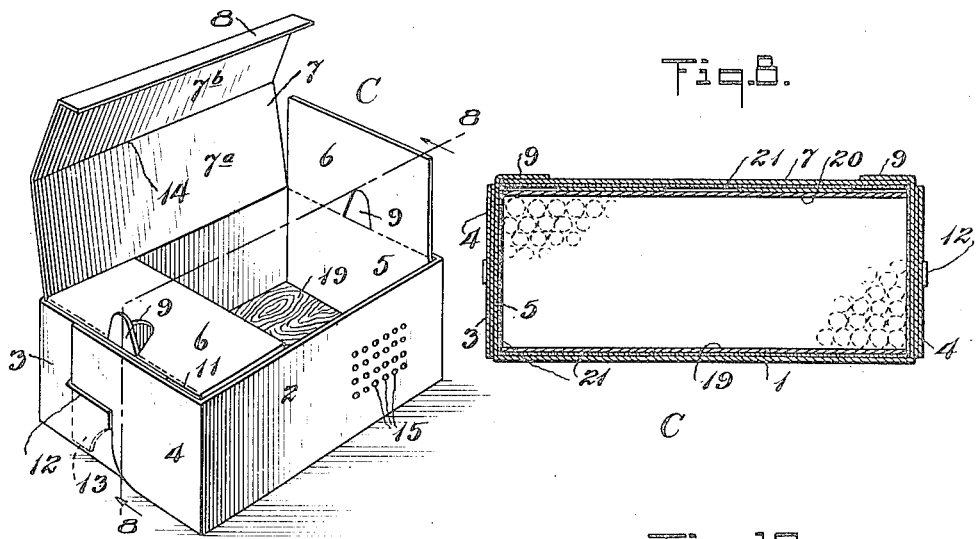

March 25, 1924.

O. W. HARMS

ART OF PACKING AND VENDING CIGARS

Filed Feb. 5, 1924    4 Sheets-Sheet 4

INVENTOR
*Otto W. Harms*
BY
ATTORNEYS

Patented Mar. 25, 1924.

1,488,044

UNITED STATES PATENT OFFICE.

OTTO W. HARMS, OF CHICAGO, ILLINOIS, ASSIGNOR TO EVER MOIST CIGAR BOX COMPANY, OF CHICAGO, ILLINOIS, A CORPORATION OF ILLINOIS.

ART OF PACKING AND VENDING CIGARS.

Application filed February 5, 1924. Serial No. 690,714.

*To all whom it may concern:*

Be it known that I, OTTO W. HARMS, a citizen of the United States, and resident of Chicago, in the county of Cook and State of Illinois, have invented certain new and useful Improvements in the Art of Packing and Vending Cigars, of which the following is a specification.

My invention relates to the art of packing and handling or vending cigars, and to containers useful for packing cigars and similar articles.

A principal object of the invention is to materially reduce the cost of packing cigars in suitable form for retail vending, with due regard to demands of the cigar trade and to Government requirements, especially laws and regulations relating to revenue stamps on tobacco packages.

The most usual and desirable mode of packing cigars in small quantities for the retail trade has been to place the cigars in orderly rows in a wood box of substantial construction, which is thrown away after it is once emptied. In most cases these boxes are of cedar or are veneered with cedar to properly flavor the cigars. The cost of such boxes is considerable and constitutes a very substantial part of the total cost of each cigar package. The internal revenue law of the United States requires that a revenue stamp shall be placed on each cigar box in such position that it is exposed to view, and must be torn or broken when the package is opened.

My invention provides a very material saving in the cost of packaging by providing an outer box or container of substantially permanent character, together with inner packages or cartons of relatively cheap construction in which the cigars are packed and shipped, these cartons being properly closed and sealed with a revenue stamp which is exposed to view and is so placed that it must be torn or broken when the carton is opened, in conformity with revenue requirements, these cartons being designed to fit and to be readily placed in the outer or permanent containers for individual use or display in retail stores. As soon as the carton is emptied it is removed and thrown away and a new filled carton inserted in the permanent container. The permanent container is provided with an opening or window properly positioned with relation to the positioning of the revenue stamp on the inner carton, so that the revenue stamp may be clearly visible from the outside of the outer box or permanent container, whether the latter is closed or open. Thus the package and method of vending complies with the revenue laws, both in the case of an original package consisting of the outer container filled with a carton enclosing the cigars, and in the case of the outer container when it is refilled with other cartons containing cigars, and embodying the carton features above mentioned.

The invention also provides outer or permanent containers, either in the form of a wooden box having characteristics more or less similar to the ordinary cigar box with adaptations to essential purposes of the invention, such as the stamp viewing opening or window, or in the form of a box of other material, and very desirably of sheet metal or "tin", which is especially strong and durable and may be made at moderate cost with regard to the character and construction and finish, and is adapted for use in the manner above described.

The invention also provides in some cases for incorporating in the inner container or carton means or features for properly conditioning or flavoring the cigars, for retaining moisture or for ventilating the package.

The invention also provides certain other features of carton construction which are advantageous for the purposes of the present invention and for other uses.

The characteristics and advantages of the invention are further sufficiently described in connection with the following detail description of the accompanying drawings, which show certain exemplifying structures embodying the invention, and also sufficiently illustrate the art or method forming a part of the invention. After considering these embodiments persons skilled in the art will understand that many variations may be made within the principles of the invention, and I do not limit myself to details, except as claimed.

In the drawings:

Fig. 1 is a perspective view of a complete cigar package consisting of an outer or permanent container with an enclosed inner container or carton.

Fig. 2 shows the outer container opened.

Fig. 3 shows the carton partly opened.

Fig. 4 shows the carton completely opened, with the cigars exposed ready for the consumers' use or for retail vending.

Fig. 7 shows the carton blank of Fig. 6 set up and ready for filling.

Fig. 8 is a longitudinal section of the same.

Fig. 9 is a perspective view of the filled, closed and stamped carton.

Fig. 10 shows the carton with a ventilator sealing piece partly removed.

Figure 6:
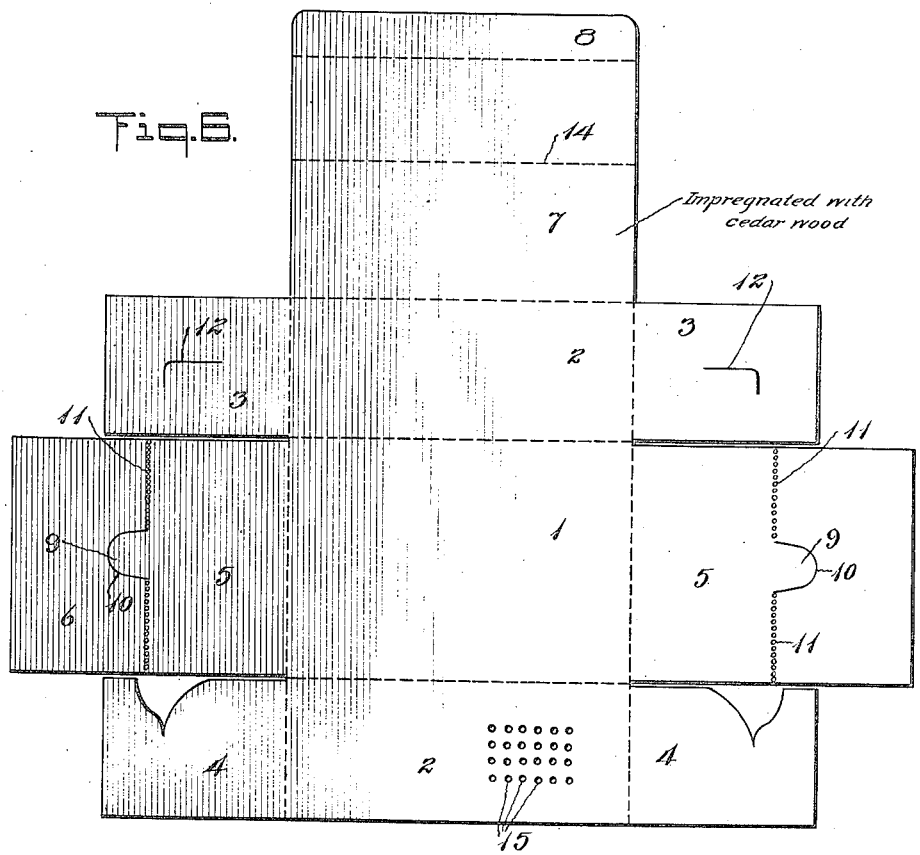
Fig. 6 shows one suitable carton blank.

Fig. 6 shows one suitable blank of cardboard or other paper or fiber stock of suitable grade and thickness, for the formation of the inner containers or cartons. The blank may be a single sheet of cardboard properly cut and creased or scored to define a bottom portion 1, side wings 2, end laps 3 and 4, end wings 5, end wing extensions 6, a cover 7 and cover flap 8. Desirably, lifting tabs 9 are formed at the outer edges of the end wings by cutting through the material along the lines 10, the bases of these lifting tabs being in line with lines of perforations 11, which enable the extensions 6 to be readily torn off. Although the box may be secured in set-up position in various ways, for instance by gluing, conveniently, in the present embodiment of the invention, the carton is held in form by a lock joint construction, consisting of slits 12 in end laps 3 and cooperating locking tabs 13 on end laps 4. In addition to the other folding creases or score marks the cover section 7 is desirably scored along the line 14 to facilitate bending in the use of the carton, as later explained.

Figure 5:
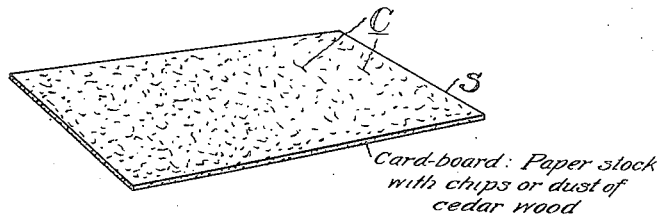
Fig. 5 shows a piece of cardboard or paper stock, especially made or treated for the manufacture of cartons for packing cigars.

While the blank material may in some cases be ordinary cardboard or other suitable paper stock, a special material is desirable in many cases. Particularly for the purpose of imparting the usually desired cedar flavor to the cigars in an economical way, the paper stock S, sufficiently represented in Fig. 5, may consist of ordinary paper stock or pulp mixed with a suitable proportion of fine chips, shreds or dust of cedar wood c. Otherwise the paper stock or cardboard may be impregnated with a suitable oil, essence or extract of cedar wood, as sufficiently indicated in Fig. 6. In either case, when the carton is filled with cigars the particles of wood or the essential flavor or extract of cedar imparted by impregnation, is delivered to the contained cigars, substantially as in the case of a cedar box.

The blank may also in some cases be provided with one or more, usually a group of small ventilating openings 15 so arranged that they may be easily covered or sealed when desired, by a slip 16 of sealing material, usually paper (Fig. 9), which may be attached by a marginal area of adhesive 17 (Fig. 10), and provided with a tab 18 free of adhesive, so that the sealing slip may be easily torn off, in the manner indicated in Fig. 10.

The described blank is folded up into box form, as shown in Fig. 7, with the side wings 2 and end wings 5 turned up at right angles to the bottom section 1, and with the end laps 3 and 4 turned inward outside the end wings and secured by inserting the tabs 13 in the slits 12. The end wing extensions 6 are left in upright position ready to be turned down when the carton is filled. The carton is now filled with a suitable number of cigars, as sufficiently indicated in Fig. 8, and when it is desired to provide additional means for flavoring or conditioning the cigars, or if the special composition or the impregnation of the carton material above mentioned is not employed, a thin piece of cedar 19, cut to fit quite closely within the carton, is laid in the bottom and the cigars are packed upon it and another piece 20 may then be laid on top of the cigars before the carton is closed. The inserted pieces of cedar are very inexpensive compared with an entire cedar box or a cedar veneer box, and they serve to flavor the cigars substantially as well as the more expensive method of packing.

In some cases where it is especially desirable to retain the moisture of the cigars in an effective way, or to exclude outside moisture, some or all of the inner surfaces of the carton may be suitably treated, for instance, by coating such surfaces with a thin layer of wax or waxy composition 21, (Fig. 8).

The carton having been filled with cigars, the end wing extensions 6 are turned down, as shown at the left in Fig. 7, and the lifting tabs 9 in some cases may be turned down with the extensions 6 or left upstanding so that they will be exposed at the outside of the closed carton. In either case the cover is folded down over the extensions 6 and the cover flap 8 is inserted within the upper edge of the front side wing 2. A revenue stamp 22, or other suitable label if for any reason a revenue stamp is not required, is then adhesively affixed so that a part of the stamp is secured to the cover 7, and another part is secured to the front wall or side wing 2. The inner package consisting of the carton with its contents, is then complete, as shown in Fig. 9. The lifting tabs 9 in this instance have been left upstanding when the cover was folded down and the tabs have then been turned down flat on the outside of the cover.

The cartons are dimensioned in approximate conformity to different standard cigar box dimensions, or to fit quite snugly, although easily, within the permanent or outside containers or boxes described below.

The carton packages, completed as above described, are ready for shipment to individual consumers or dealers. They are very much cheaper, and in fact cost only a fraction as much as the ordinary wood cigar boxes. They are sufficiently strong and rigid to stand the strains of shipment and to properly protect the enclosed cigars. Even when constructed of ordinary cardboard or paper stock they are sufficiently impervious to moisture to retain the moisture content of the cigars for a considerable time or sufficiently for ordinary purposes, but when it is desirable to prevent change of the moisture content for a longer time or more effectively, the material may be specially treated, as by wax, in a manner previously referred to. The insertion of slips of cedar word or the special composition or impregnation of the carton material, above referred to, serve to impart the desirable cedar aroma and flavor to the cigars at a very small cost in comparison with the ordinary cedar box. The package is properly sealed with a revenue stamp exposed to view in accordance with law, and placed so that it must be torn before the cover can be raised to give access to the contents. In some cases the ventilating openings 15 may be left free or open, but usually they are closed by the sealing slip 16 to retain moisture until the time the package is required for use.

Figs. 1 to 4 show one suitable form of permanent container or outer box designed for use with the inner packages of cartons. In this particular embodiment of the invention the box 30 is of sheet metal construction, such as "tin," of suitable quality. The box is dimensioned so that cartons of a particular size fit easily and closely within it, or in other words, the boxes are of substantially the dimensions of different standard cigar boxes. Usually the box has a hinged lid 31 provided with any suitable fastener or clasp 32. An opening or window 33 is provided in a suitable part of the box, most desirably in the front wall and in such a position that the revenue stamp 22, of the character previously described, is readily observed through the window when the carton is in position in the box. One or more of these outer containers are provided for individual consumers or for retail dealers.

In initially supplying consumers or the trade with packages embodying the invention, the first shipment of packages may consist of the outer boxes 30, as shown in Fig. 1, each filled with a completed carton, such as shown in Fig. 9. Such a complete package complies with the internal revenue laws, in clearly exhibiting the revenue stamp through the opening 33. The outer box is opened by raising the cover, giving immediate access to the cover 7 of the carton, which is raised after the revenue stamp has been torn along the fold line of the cover flap 8. The package is then in the condition shown in Fig. 3. The end wing extensions 6 may be allowed to remain in position, but more desirably they are torn off along the perforated lines 11, and when a cedarwood insert 20 is employed, as shown in Fig. 3, it is lifted out. For greater convenience the cover 7 may be torn off or may be folded back with the cover section $7^a$ against the rear side wall 2 of the carton and with the cover section $7^b$ and the flap 8 against the bottom of the carton, and the carton may be then reinserted in the outer box, so that the complete package is in the condition shown in Fig. 4, with the cigars fully exposed for ready removal, and the portion of the revenue stamp remaining on the front wall of the carton clearly exposed to view through the aperture 33.

The lifting tabs 9 project up at the ends of the carton so that when the carton is emptied, it may be quickly and easily removed and thrown away and a new carton is then inserted, and so on. The outer boxes are substantially permanent containers which will last practically indefinitely, and the inner packages are refill packages of very economical construction. By means of the described containers and method of packing and vending, therefore, the economic loss or wastage of relatively expensive cedar or other wooden boxes is avoided.

In some cases a number of the complete carton packages may be stored for sometime before use, for instance, in the humidor of a retail dealer. In such cases the sealing slips 16 may be torn off as sufficiently indicated in Fig. 10, to permit the enclosed cigars to absorb the moist air of the humidor.

Figure 11:
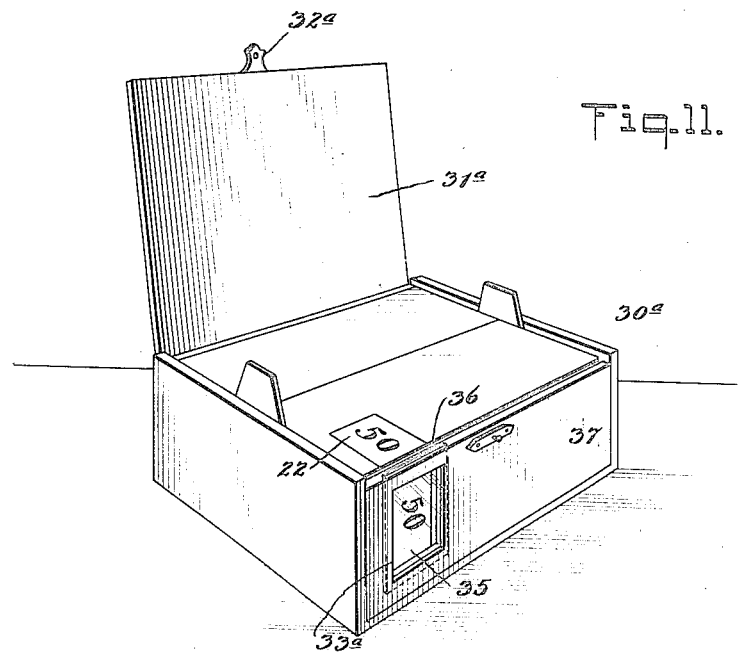
Fig. 11 is a perspective view of a modified complete package consisting of a wooden box or outer container, with a filled carton inserted.
Figure 12:
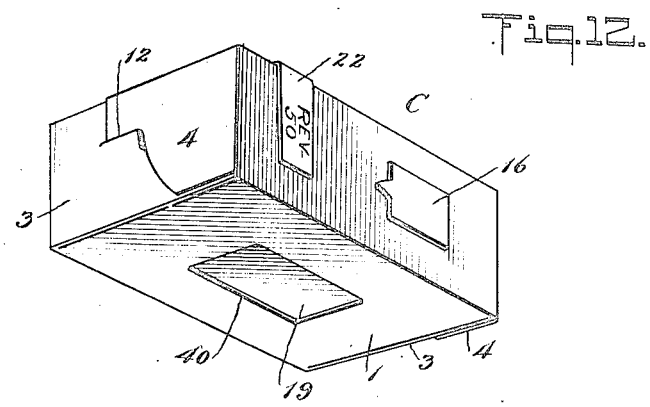
Fig. 12 is a bottom perspective view of a filled carton showing a modified construction.

Fig. 11 shows a modification of the invention, in which the outer container $30^a$ is of wood, usually cedar or cedar veneer, and resembles substantially an ordinary cedar cigar box, although, since it is of a relatively permanent character its construction may desirably be made more substantial and expensive, than is usually the case with wooden cigar boxes of ordinary grade. The box has a hinged cover $31^a$ and any suitable fastening or clasp $32^a$. The outer box contains a filled carton substantially in accordance with the previous description of carton construction. The revenue stamp inspection window 33ᵃ is provided in this case with a covering 35, which may be a piece of glass or celluloid, or other suitable transparent material inserted through a slot 36 in the upper edge of the front wall 37. Since the wooden boxes 30ᵃ are usually of cedar, when they are used some of the expedients employed, as above described, for flavoring the cigars in the cartons, may be dispensed with. The ventilating holes 15 may, in this case, be employed largely to permit the flavor of the cedar box to impregnate the cigars within the carton and for this purpose the sealing slip 16 is torn off before the carton is placed in the box. The cartons may, of course, be used for refill purposes in this instance, the same as in the case of metal boxes. Fig. 12 shows a modification of carton construction in which the bottom 1 of the carton is provided with an opening 40, for ventilating purposes or to permit the cedar flavor of the wooden box to readily enter the carton and flavor the cigars.

The usual Government classification stamp or label required in some cases may be placed on the front wall of the carton in a suitable position, for instance adjacent to or just below the revenue stamp, and when necessary or desirable the window or opening in the front wall of the outer container may be arranged to permit observation of this classification label.

In placing the opened inner package or carton in the outer container, instead of tearing off the top flaps 6, as previously referred to, they may instead be simply folded down against the end walls of the carton, and the carton with the downwardly folded flaps and with the top flap 7 folded down at the back of and below the carton, may be inserted in the outer container. The top flaps 6 are proportioned so that they may be folded down in the manner stated without coming below the bottom of the carton or, in other words, they are of the same depths when folded as the end portions 5.

What I claim is:

1. A mercantile package comprising an outer permanent rectangular container having a movable cover and a relatively small stamp inspection opening in one wall, and an inner refill carton formed of a blank of fibrous sheet material folded to carton form constructed to fit within and dimensioned to substantially fill the container, the carton being normally filled with cigars and having a liftable cover, the carton having a revenue stamp applied to seal the carton and arranged in such position that a portion of the stamp is visible through said inspection opening in the container, and accessible lifting means associated with the package to permit removal of the carton from the outer container.

2. A mercantile cigar package comprising an outer permanent rectangular container having a movable cover and a relatively small stamp inspection opening in one wall, and an inner refill carton formed of a blank of fibrous sheet material folded to carton form adapted to fit within and dimensioned to substantially fill the container, the carton being filled with cigars and normally sealed and having a liftable cover, foldable lifting tabs formed integral with carton end walls and arranged to project upward for convenient lifting of the carton, the carton having a revenue stamp applied to seal the carton in such position that a portion of the stamp is visible through said inspection opening in the container.

3. A mercantile package comprising an outer permanent rectangular container having a movable cover and a relatively small stamp inspection opening in one wall, and an inner refill carton of fibrous sheet material within and dimensioned to substantially fill the container, the carton being normally filled with cigars and sealed and having a liftable and foldable cover, the carton being coated with moisture-proof material to maintain the cigars in fresh condition, the carton having a revenue stamp applied to seal the carton and arranged in such position that a portion of the stamp is visible through said inspection opening in the container, and accessible lifting means associated with the package to permit removal of the carton from the outer container.

4. A mercantile cigar package comprising an outer permanent rectangular container having a movable cover and a relatively small stamp inspection opening in one wall, and an inner refill carton of fibrous sheet material within and dimensioned to substantially fill the container, the carton being normally filled with cigars and having a liftable cover, accessible lifting tabs on carton end walls foldable parallel with the carton cover when the latter is closed and arranged to project upward at the end walls of the container for convenient lifting of the carton when the carton cover is opened, the carton having a revenue stamp applied to seal the carton in such position that a portion of the stamp is visible through said inspection opening.

5. A mercantile cigar package comprising an outer permanent rectangular container having a movable cover and a relatively small stamp inspection opening in one wall, and an inner refill carton of fibrous sheet material in blank form arranged within and dimensioned to substantially fill the container, the carton being normally filled with cigars and sealed and having a liftable cover, the inner surface of the carton being coated with moisture-proof material to maintain the cigars in fresh condition, the carton having a revenue stamp applied to seal the carton and arranged in such position that a portion of the stamp is visible through said inspection opening in the container, and accessible lifting means associated with the package to permit removal of the carton from the outer container.

6. In combination, a mercantile container and a refill cigar package adapted for economical packing, shipping and protection of cigars for retail vending or consumer's use, said container consisting of a rectangular stiff-walled box with a hinged cover and a relatively small stamp-inspection opening occupying a small part of the front wall area, said package comprising a carton formed from a blank, of flexible fibrous sheet material folded to carton form and filled with cigars and having integral foldable lifting tabs on the end walls, a foldable cover extending from the rear wall and adapted to be folded down parallel with the folded lifting tabs, a revenue stamp applied to adjacent portions of the front wall and cover to seal the package, the revenue stamp portion on the carton front wall being arranged with reference to the location of the inspection opening in the container, the package being dimensioned to fit closely and slidably in the container with a portion of the revenue stamp visible through the container opening and with the lifting tabs upstanding at the end walls of the container when the container and carton are open and arranged for access to the cigar contents.

7. In combination, a mercantile container and a refill cigar package adapted for economical packing, shipping and protection of cigars for retail vending or consumers' use, said container consisting of a rectangular stiff-walled box with a hinged cover and a relatively small stamp-inspection opening occupying a small part of the front wall area, said package comprising a paper carton filled with cigars and having top flaps on its end walls adapted to be folded down upon the cigar contents, foldable lifting tabs on the end walls cut from the top flaps, and a foldable cover extending from the rear wall and adapted to be folded down parallel with the top flaps and lifting tabs when the package is closed, a revenue stamp applied to adjacent portions of the front wall and cover to seal the package, the revenue stamp portion on the carton front wall being arranged with reference to the location of the opening in the container, the package being dimensioned to fit closely and slidably in the container with a portion of the revenue stamp visible through the container opening and with the lifting tabs upstanding at the end walls of the container when the container and carton are open and arranged for access to the cigar contents.

8. A cigar package especially adapted as a refill for use in connection with an outer permanent container, said package consisting of a carton formed from a single blank of fibrous sheet material folded to carton form, the carton being normally filled with cigars and having a liftable cover and end wing extensions foldable over the cigars, and relatively small lifting-tabs formed integral with the carton end-walls and substantially centrally thereof, said wing extensions being adapted to be folded to expose the cigars and leave said lifting-tabs free to be grasped, for the purpose specified.

9. A cigar package adapted as a refill for use in connection with an outer permanent container, said package consisting of a carton formed from a single blank of relatively stiff fibrous material folded to carton form, the carton being normally filled with cigars and having interlocking side wings, a liftable cover and end wings with integral extensions, said cover and end wing extensions being foldable over the cigars to close the carton, and relatively small lifting-tabs formed integral with the carton end walls and substantially centrally thereof, said wing extensions being adapted to be folded to expose the cigars and leave said lifting tabs free to be grasped, for the purpose specified.

10. A mercantile package comprising an outer permanent rectangular container having a movable cover and a relatively small stamp inspection opening in one wall, and an inner refill carton formed of paper stock constructed to fit within and dimensioned to substantially fill the container, the carton being normally filled with cigars and having a liftable cover, the carton having a revenue stamp applied to seal the carton and arranged in such position that a portion of the stamp is visible through said inspection opening in the container, said carton being readily removable from the container, whereby revenue notices contained on the exterior thereof may be inspected.

11. A mercantile package comprising an outer permanent rectangular container having a movable cover and a relatively small stamp inspection opening in one wall, and an inner refill carton formed of paper stock constructed to fit within and dimensioned to substantially fill the container, the carton being normally filled with cigars and having a liftable cover, the carton having a revenue stamp applied to seal the carton and arranged in such position that a portion of the stamp is visible through said inspection opening in the container, and accessible lifting means associated with the package to permit removal of the carton from the outer container.

12. A mercantile cigar package comprising an outer permanent rectangular container having a movable cover and a relatively small stamp inspection opening in one wall, and an inner refill carton formed of paper stock adapted to fit within and dimensioned to substantially fill the container, the carton being filled with cigars and normally sealed and having a liftable cover, foldable lifting tabs formed integral with carton end walls and arranged to project upward for convenient lifting of the carton, the carton having a revenue stamp applied to seal the carton in such position that a portion of the stamp is visible through said inspection opening in the container.

Signed at Chicago in the county of Cook and State of Illinois this 1st day of February A. D. 1924.

OTTO W. HARMS.